(12) United States Patent
Hatfield et al.

(10) Patent No.: US 10,974,676 B2
(45) Date of Patent: Apr. 13, 2021

(54) LIFE DETECTION SYSTEM

(71) Applicant: Proof of Life Innovations LLC, Krum, TX (US)

(72) Inventors: Erik C. Hatfield, Denton, TX (US); Michael D. White, Krum, TX (US)

(73) Assignee: Proof of Life Innovations LLC, Krum, TX (US)

( * ) Notice: Subject to any disclaimer, the term of this patent is extended or adjusted under 35 U.S.C. 154(b) by 180 days.

(21) Appl. No.: 16/239,702

(22) Filed: Jan. 4, 2019

(65) Prior Publication Data
US 2019/0210550 A1    Jul. 11, 2019

Related U.S. Application Data

(60) Provisional application No. 62/614,754, filed on Jan. 8, 2018.

(51) Int. Cl.
| | | |
|---|---|---|
| *B60R 21/015* | (2006.01) | |
| *G08B 21/24* | (2006.01) | |
| *G08B 21/22* | (2006.01) | |
| *G06K 9/00* | (2006.01) | |
| *B60Q 9/00* | (2006.01) | |

(52) U.S. Cl.
CPC .. *B60R 21/01542* (2014.10); *B60R 21/01538* (2014.10); *B60R 21/01556* (2014.10); *G08B 21/22* (2013.01); *G08B 21/24* (2013.01); *B60Q 9/003* (2013.01); *G06K 9/00832* (2013.01)

(58) Field of Classification Search
CPC .......... B60R 21/01542; G06K 9/00832; G08B 21/22
See application file for complete search history.

(56) References Cited

U.S. PATENT DOCUMENTS

| | | | | |
|---|---|---|---|---|
| 6,922,147 B1* | 7/2005 | Viksnins | ................ | B60N 2/002 340/573.1 |
| 9,384,647 B1* | 7/2016 | Arnold | .................... | G08B 21/02 |
| 2008/0157985 A1* | 7/2008 | Wilson | ................... | B60N 2/002 340/584 |
| 2008/0211668 A1* | 9/2008 | Dixon | .................... | B65D 90/00 340/541 |
| 2009/0146813 A1* | 6/2009 | Nuno | ..................... | G08B 21/22 340/572.1 |
| 2011/0121956 A1* | 5/2011 | Rodriguez | ............... | B60Q 1/50 340/425.5 |
| 2011/0241855 A1* | 10/2011 | Weaver | ............... | B60R 16/0237 340/426.25 |
| 2016/0071388 A1* | 3/2016 | Levons | .................. | G08B 21/24 340/584 |
| 2016/0075296 A1* | 3/2016 | Alderman | .............. | G08G 1/205 340/989 |
| 2016/0272112 A1* | 9/2016 | DeGrazia | ................ | H02S 10/20 |
| 2018/0126950 A1* | 5/2018 | Alderman | ............... | H04L 67/30 |
| 2018/0194360 A1* | 7/2018 | Hill | ........................ | B60W 50/14 |
| 2019/0088103 A1* | 3/2019 | Lebron | .............. | G08B 21/0225 |

* cited by examiner

*Primary Examiner* — Anshul Sood
(74) *Attorney, Agent, or Firm* — Zarley Law Firm, P.L.C.

(57) ABSTRACT

A life and property protection system including a monitoring member having a plurality of sensors and devices for monitoring the interior of the vehicle and communicating with phone devices of designated individuals and 911 dispatch. The system has an activation mode that is triggered when motion is detected, a pre-alarm mode triggered when preset criteria is met, and an alarm mode when the system is not manually reset after a preset time period following a text to designated phone devices.

19 Claims, 2 Drawing Sheets

LIFE DETECTION SYSTEM

CROSS REFERENCE TO RELATED APPLICATION

This application claims the benefit of priority from Provisional Application No. 62/614,754 filed Jan. 8, 2018, the contents of these applications are hereby incorporated by reference in their entirety.

BACKGROUND OF THE INVENTION

This invention is directed to a life detection system and more particularly to a system for detecting the presence of a person and/or a pet in a vehicle in a dangerous or unwanted situation.

Over the past few years in the news we have heard of tragic stories where children or pets are unintentionally left in locked vehicles under extreme heat conditions. If left for too long of a period, these situation have tragic consequences including death. Likewise, unattended vehicles are frequently targeted for burglaries causing damage to the vehicle and lost property.

Presently, no known system is known for detecting the presence of an individual or a pet in a vehicle, notifying a vehicle owner or operator, and notifying authorities when necessary. While car alarms provide a deterrent, they provide no assistance in documenting and recording evidence to apprehend the burglar. Therefore, a need exists in the art for a system that addresses these needs and deficiencies.

An objective of the present invention is to provide a life detection system that prevents injury to individuals and pets left in vehicles in extreme conditions.

Another objective of the present invention is to provide a life detection system that records evidence of a vehicle burglary.

These and other objectives will be apparent to those skilled in the art based upon the following written description, drawings, and claims.

SUMMARY OF THE INVENTION

A life detection system includes a monitoring member associated with the interior of a vehicle. The monitoring member has a housing. Attached to, or disposed within, the housing are a plurality of sensors that detect parameters associated with the interior of the vehicle and device that gather, process, and transmit information to phone devices and 911 dispatch.

Generally, using a motion sensor, the system continuously monitors the interior of the vehicle for motion. Upon detection of motion a signal is sent to a computer which triggers an activation mode. In the activation mode, a plurality of sensors are monitoring parameters such as temperature and $CO_2$ within the vehicle and searching for designated phone devices.

Based on information received, a processor compares the detected information with preset criteria (i.e. temperature, connection with phone devices, etc.). If preset criteria is met the processor triggers a pre-alarm mode. During the pre-alarm mode at least one, and preferably more, texts are sent to designated phone devices requesting that the system be manually reset within a preselected time period. If not manually reset within the preset time period, then the processor triggers an alarm mode where the processor sends an alarm and GPS coordinates to 911 dispatch.

DETAILED DESCRIPTION

Figure 1:
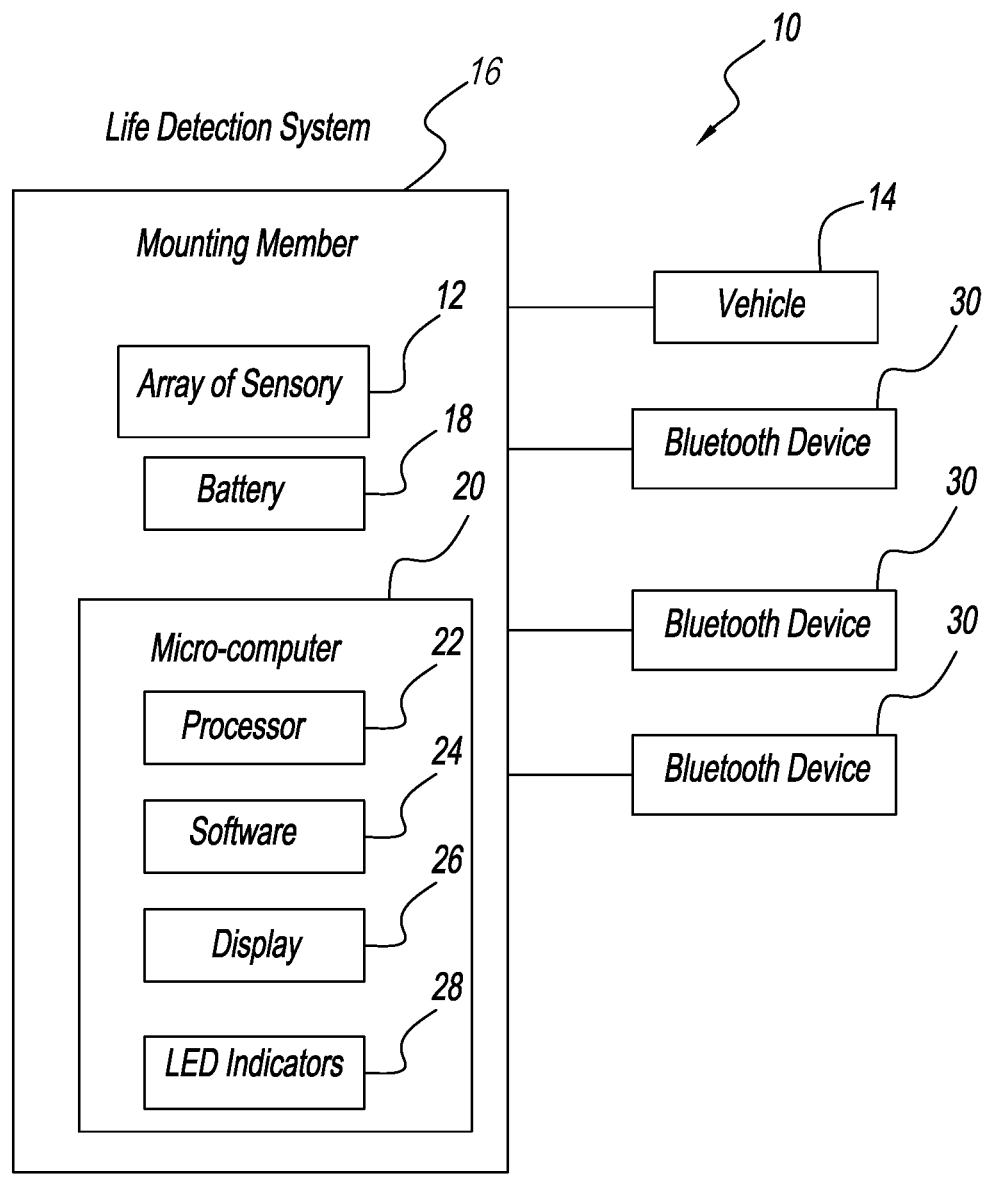
FIG. 1 is a schematic view of a life detection system.
Figure 2:
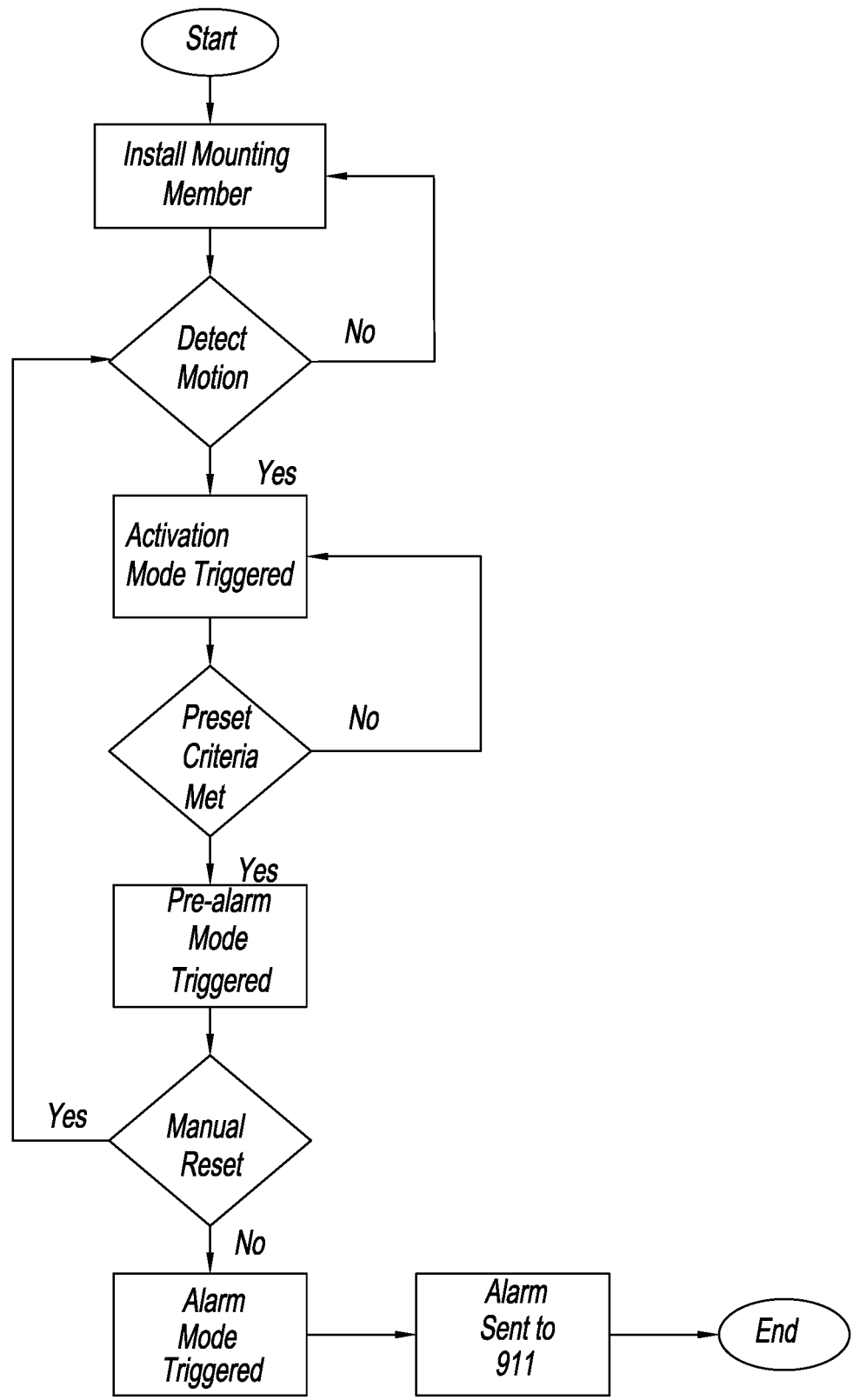
FIG. 2 is a flow diagram of a life detection system.

Referring to the Figures, a life detection system 10 includes one or more, and preferably, an array of sensors and devices 12 associated with a vehicle 14. The sensors 12 are of any type and by example include a motion sensor, a sound sensor, a temperature sensor, a $CO_2$ sensor, a camera, a solar cell, a USB connector, a Bluetooth, and/or cellular communications device with a GPS system. Preferably, the array of sensors 12 are connected to a mounting member 16 or housing having a battery 18 that is mounted within the vehicle such as to a rear door or window. Preferably, the system is portable and can be transferred between vehicles 14. Alternatively, the system is integrated into the vehicle 14. The vehicle 14 is of any type and includes automobiles, school buses, day care vehicles, senior care transportation vehicles, airplane cockpits, military vehicles, and the like. The mounting member 16 includes a micro-computer 20 with a processor 22, software 24, and a display 26 that shows LED indicators or icons 28 associated with the array of sensors 12.

In operation, the system has a first or activation mode. In the activation mode, the system 10 constantly monitors the interior of the vehicle for movement by an individual or an animal. Once movement is detected, a signal is sent to the processor 22 which, utilizing the software 24, then activates the camera, sound sensor, $CO_2$ sensor, and the temperature sensor. The processor 22 also begins searching for Bluetooth or personal phone devices 30. Bluetooth devices are assigned to defined participants. Preferably, the system 10 is limited to three Bluetooth devices 30 and connects to nearby devices. The system 10 also is activated to document and record a time stamp code.

In a second, or pre-alarm mode, if preset criteria is met the second mode is activated. For example if a Bluetooth connection is broken beyond a preset distance such as twenty feet and/or the internal temperature of the vehicle 14 exceeds a preset temperature, a pre-alarm process is activated. Once activated, a text is sent to a first Bluetooth device 30 within a predetermined period, such as five seconds, after the Bluetooth connection is broken. During this mode, the system will continue to search for nearby Bluetooth connections. After a second preset period of time, such as one minute, the system 10 sends an alert to the first Bluetooth device 30 requiring a manual reset. After a third preset period of time, such as an additional two minutes, if the system has not been re-set manually, a text will be sent to a second device 30 and after another preset period of time, such as an additional two minutes, a text is sent to a third Bluetooth device 30. If after another preset period of time, such as five minutes, if the system has not been manually re-set, the system moves on to a third or alarm mode where the system will send an alarm to 911 dispatch with GPS coordinates. The system 10 has a reset button on the monitoring member 16 which when activated returns the system to the activation/monitoring mode.

Also, in the third or alarm mode, the video camera will begin and continue to record live streaming for authorities, and the system continues to send texts to the first, second, and third Bluetooth devices 30 including notifications that authorities have been contacted. The system's sequence of events are recorded and can be extracted for evidence and time lapse purposes as needed. The system 10 includes a simple user interface and a controllable mobile app.

Accordingly, a life detection system has been disclosed that at the very least meets all the stated objectives.

From the above discussion and accompanying figures and claims it will be appreciated that the life detection system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A life and property detection system, comprising:
   a monitoring member having a housing and a microcomputer with an array of sensors and devices and a micro-computer attached to the housing;
   wherein, the monitoring member is associated with a vehicle and configured to operate in an activation mode, a pre-alarm mode, and an alarm mode;
   wherein when motion is detected in an interior of the vehicle by a motion sensor of the array of sensors and devices, a camera, a sound sensor, a $CO_2$ sensor, and a temperature sensor are activated and the monitoring member begins searching for a phone device.

2. The system of claim 1 wherein the array of sensors and devices include a temperature sensor and a communication device.

3. The system of claim 1 wherein the system is integrated with the vehicle.

4. The system of claim 1 wherein the motion sensor constantly monitors an interior of the vehicle for motion.

5. The system of claim 1 wherein upon entering the activation mode, the monitoring member is activated to document and record a time stamp code.

6. The system of claim 1 wherein the pre-alarm mode is activated when preset criteria is met.

7. The system of claim 6 wherein the preset criteria includes a phone connection broken beyond a preset distance.

8. The system of claim 6 wherein the preset criteria includes an internal temperature of the vehicle exceeding a preset temperature.

9. The system of claim 1 wherein the pre-alarm mode includes one or more texts sent to a phone device requiring a manual reset before a preset time expires.

10. The system of claim 1 wherein the alarm mode is activated when, in response to a text to a phone device, a manual reset does not occur within a preset amount of time.

11. The system of claim 1 wherein upon activation of the alarm mode an alarm is sent to a designated emergency service with GPS coordinates.

12. The system of claim 1 further comprising a reset button on the monitoring member.

13. A method of performing a life detection system, comprising the steps of:
   installing a monitoring member having a housing and a microcomputer with an array of sensors and devices in a vehicle;
   detecting motion within an interior of the vehicle;
   activating a temperature sensor upon detecting motion within an interior of the vehicle;
   meeting preset criteria associated with the monitoring member;
   sending at least one text to a phone device requiring a manual reset within a preset time period; and
   sending an alarm to a designated emergency service with GPS coordinates if no manual reset occurs within the preset time period.

14. A method of performing a life detection system, comprising the steps of:
   installing a monitoring member in a vehicle;
   providing the monitoring member with a reset button;
   monitoring constantly an interior of the vehicle with a motion sensor of the monitoring member;
   detecting motion within an interior of the vehicle with the motion sensor;
   sending a signal from the motion sensor to a processor of the monitoring member to activate with a software a camera, a sound sensor, and a temperature sensor;
   searching for a personal device with the processor, wherein the personal device is assigned to a defined participant;
   sensing a predefined criteria related to one of a group consisting of the personal device exceeding a predefined distance from the mounting member, the temperature sensor detecting a temperature outside of a predefined temperature, sending a first message to a first personal device associated with a first defined participant within a first predefined period of time after the predefined criteria is sensed;
   sending a second message to the first personal device associated with the first defined participant after a second predefined period of time has elapsed from the first predefined period of time, wherein the second message notifies the first defined participant that a manual reset is needed within a third predefined period of time;
   sending a third message to a second personal device associated with a second defined participant after the third predefined period of time since the second predefined period of time;
   sending a fourth message to a third personal device associated with a third defined participant after a fourth predefined period of time since the third predefined period of time; and
   sending a fifth message to a designated emergency service with GPS coordinates of the mounting member after a fifth predefined period of time since the fourth predefined period of time.

15. The method of claim 14 further comprising the step of activating the camera and initiating a live stream after the fifth predefined period of time.

16. The method of claim 14 further comprising the step of sending at least one message to the first personal device, second personal device, and third personal device after the fifth predefined period of time.

17. The method of claim 16 wherein the at least one message includes a notification that designated emergency services have been messaged.

18. The method of claim 14 further comprising the step of providing the monitoring member with a housing and a battery.

19. The method of claim 14 further comprising the step of providing the monitoring member with a plurality of indicators, wherein the plurality of indicators are associated with the sound sensor and the temperature sensor.

* * * * *